(12) United States Patent
Norton

(10) Patent No.: US 8,794,993 B2
(45) Date of Patent: Aug. 5, 2014

(54) UTILITY COUPLER WITH FAILSAFE FEATURES

(75) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 82 days.

(21) Appl. No.: 13/572,359

(22) Filed: Aug. 10, 2012

(65) Prior Publication Data

US 2014/0041187 A1    Feb. 13, 2014

(51) Int. Cl.
*H01R 13/62*    (2006.01)

(52) U.S. Cl.
USPC .......................................... 439/372

(58) Field of Classification Search
USPC ................. 439/372, 378, 352, 358; 29/843
See application file for complete search history.

(56) References Cited

U.S. PATENT DOCUMENTS

| | | | |
|---|---|---|---|
| 3,214,195 A | 10/1965 | Zahuranec et al. | |
| 4,318,557 A * | 3/1982 | Bourne et al. | 292/113 |
| 4,568,110 A | 2/1986 | Momberg | |
| 4,634,204 A * | 1/1987 | Detter et al. | 439/347 |
| 4,768,815 A * | 9/1988 | Harmon | 292/113 |
| 4,842,543 A * | 6/1989 | Davis | 439/378 |
| 5,316,347 A | 5/1994 | Arosio | |
| 5,620,212 A * | 4/1997 | Bourne et al. | 292/113 |
| 5,713,752 A * | 2/1998 | Leong et al. | 439/358 |
| 5,741,150 A * | 4/1998 | Stinson et al. | 439/358 |
| 5,951,316 A * | 9/1999 | Kawano et al. | 439/352 |
| 5,961,162 A * | 10/1999 | Glaser et al. | 292/198 |
| 5,984,382 A * | 11/1999 | Bourne et al. | 292/113 |
| 6,149,451 A * | 11/2000 | Weber | 439/358 |
| 6,189,349 B1 * | 2/2001 | Helot et al. | 70/58 |
| 6,234,426 B1 * | 5/2001 | Renken et al. | 244/159.4 |
| 6,279,971 B1 * | 8/2001 | Dessenberger, Jr. | 292/113 |
| 7,389,794 B2 | 6/2008 | Knuthson | |
| 8,251,761 B2 * | 8/2012 | Shamoto et al. | 439/892 |
| 8,322,566 B2 * | 12/2012 | Hackett | 220/812 |
| 2005/0255737 A1 * | 11/2005 | Bella et al. | 439/352 |
| 2005/0285390 A1 | 12/2005 | Martin | |
| 2006/0094281 A1 * | 5/2006 | Dang | 439/352 |
| 2009/0058077 A1 | 3/2009 | Schulz et al. | |
| 2011/0086520 A1 * | 4/2011 | Mills et al. | 439/64 |
| 2011/0256753 A1 * | 10/2011 | Gulla | 439/378 |

* cited by examiner

*Primary Examiner* — Alexander Gilman

(74) *Attorney, Agent, or Firm* — Coats and Bennett, P.L.L.C.

(57) ABSTRACT

A utility coupler comprises a coupling unit that is coupled to a tool unit via the reciprocal linear actuation of a hooking cam member in the coupling unit engaging a latching pin in the tool unit. The hooking cam member includes a composite cam surface operative to couple and hold the two units together as the latching pin engages different surfaces of the composite cam surface. Failsafe features prevent the inadvertent decoupling of the units.

21 Claims, 8 Drawing Sheets

UTILITY COUPLER WITH FAILSAFE FEATURES

FIELD OF INVENTION

The present invention relates generally to utility couplers, and in particular to a utility coupler operative to mate industrial equipment to a utility supply, the coupler having features to prevent its inadvertent uncoupling.

BACKGROUND

Industrial equipment, such as automotive and aviation manufacturing equipment, often requires utilities for operation. Such utilities may comprise, for example, compressed air, hydraulic fluid, electrical power, data signals, and the like. For modularity of design, ease of reconfiguration, ease of maintenance and upgrade, and similar reasons, it is advantageous not to install permanent utility couplings on all industrial equipment. Rather, the equipment may be fitted with a utility coupler. As used herein, a utility coupler is a device comprising two units—referred to herein as a tool unit and a coupling unit—that may be selectively coupled together and decoupled from each other. When coupled, mating utility couplings provide for the passing of utilities across the utility coupler interface. A tool unit of the utility coupler is rigidly affixed to industrial equipment, and the utility couplings of the tool unit attached to provide the utility to the equipment. Corresponding utility couplings of a coupling unit of the utility coupler are attached to a source and/or sink of the utility. When the industrial equipment is activated, the appropriate (preconfigured) utilities are provided by simply coupling the utility unit to the tool unit. In many cases, the coupling unit is preferably manually coupled to the tool unit.

Various means of mechanically coupling devices are known in the art. However, in the case of utility couplers, it would be advantageous for a coupling mechanism to operate without inducing torque that may skew the alignment between tool and coupling units. Additionally, to achieve a tight fit with minimal effort, a manual coupling mechanism employing mechanical advantage would represent an advance over the state-of-the-art.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a utility coupler comprises a coupling unit that is coupled to a tool unit via the reciprocal linear actuation of a hooking cam member in the coupling unit engaging a latching pin in the tool unit. The hooking cam member includes a composite cam surface operative to couple and hold the two units together as the latching pin engages different surfaces of the composite cam surface. Failsafe features prevent the inadvertent decoupling of the units.

One embodiment relates to a utility coupler operative to provide one or more utilities to industrial equipment. The utility coupler includes a tool unit affixed to industrial equipment and a coupling unit. The tool unit includes a housing having a longitudinal groove formed therein; a latching pin disposed transversely in the groove; and one or more tool unit utility couplings. The coupling unit includes a housing; a hooking cam member reciprocally moveable in the housing in a linear direction and operative to capture the latching pin; a composite cam surface on the hooking cam member operative to engage the latching pin and lock the coupling unit to the tool unit as the hooking cam member moves linearly within the groove; and one or more coupling unit utility couplings operative to mate with corresponding tool unit utility couplings to pass utilities to industrial equipment when the tool unit and coupling unit are coupled together.

Another embodiment relates to a method of supplying utilities to industrial equipment comprising a tool unit including a groove formed in a housing thereof, with a latching pin transversely mounted in the groove, and one or more utility couplings. A coupling unit having a hooking cam member mounted so as to reciprocally move in a linear direction in response to the actuation of a handle, is positioned so that the hooking cam member is disposed within the groove of the tool unit and the latching pin enters the interior of the hooking cam member. A coupling mechanism is then actuated to move the hooking cam member linearly along the axis of the groove, and to couple the coupling unit to the tool unit by interaction of the latching pin with cam surfaces in the hooking cam member.

Yet another embodiment relates to a utility coupler. The utility coupler comprises a tool unit including a housing having a longitudinal groove formed therein, a latching pin disposed transversely in the groove, and one or more tool unit utility couplings. The utility coupler further comprises a coupling unit including one or more coupling unit utility couplings operative to mate with corresponding tool unit utility couplings to pass utilities when the tool unit and coupling unit are coupled together, and coupling means for coupling the coupling unit to the tool unit, without applying torque, by capturing the latching pin in a hooking cam member and moving it along a composite cam surface.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. Orientation of the elements in the drawings is consistent. Accordingly, terms of reference such as up, down, left, right, vertical, horizontal, and the like, which are used herein for clarity of expression, apply only to the orientation of elements in the drawings and are hence relative, and not absolute, directions. Naturally, in use, the elements depicted in the drawings may assume any orientation or be viewed from a different perspective.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
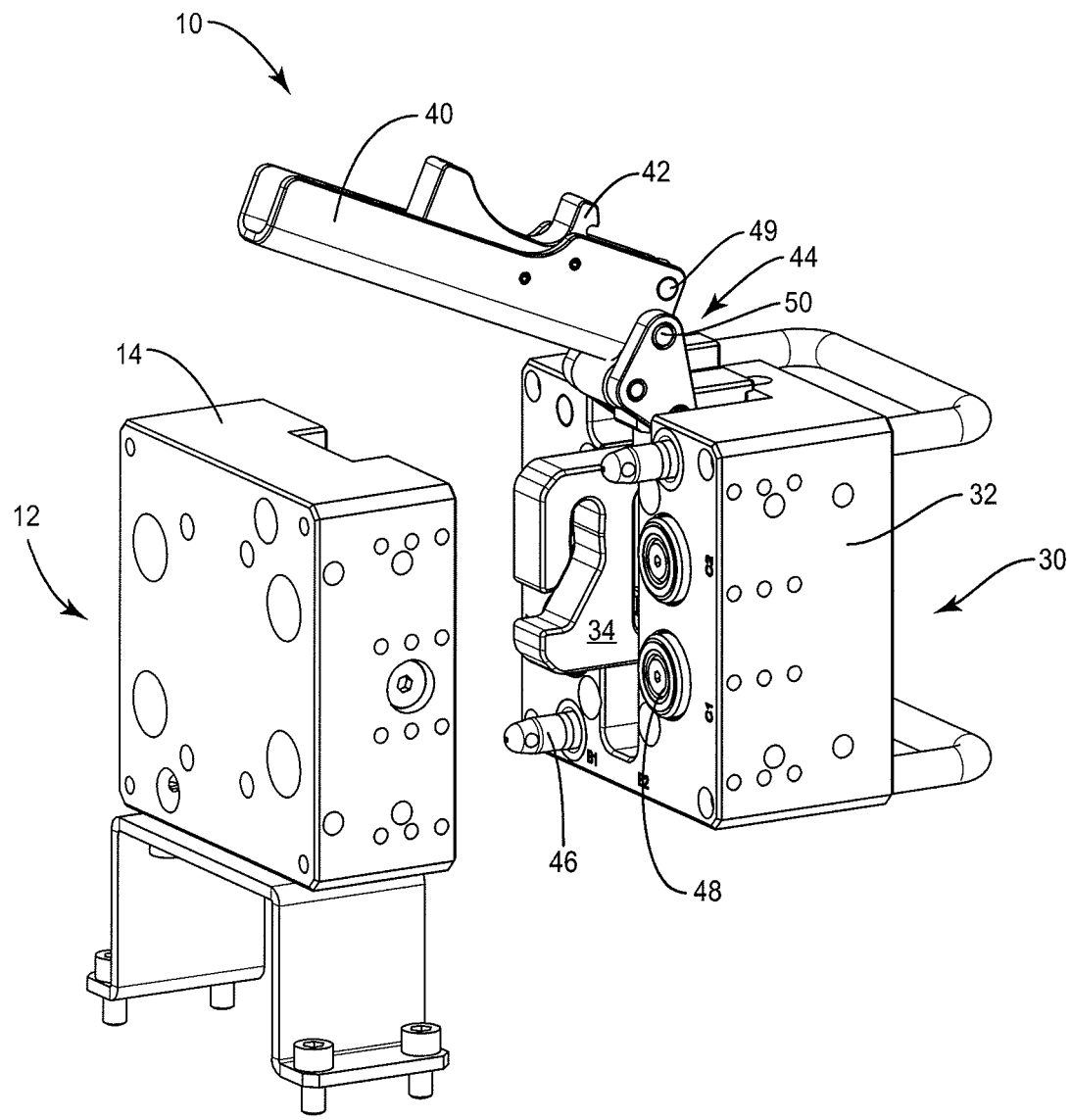
FIG. 1 is a perspective view of a manually actuated utility coupler showing features of a coupling unit.
Figure 2:
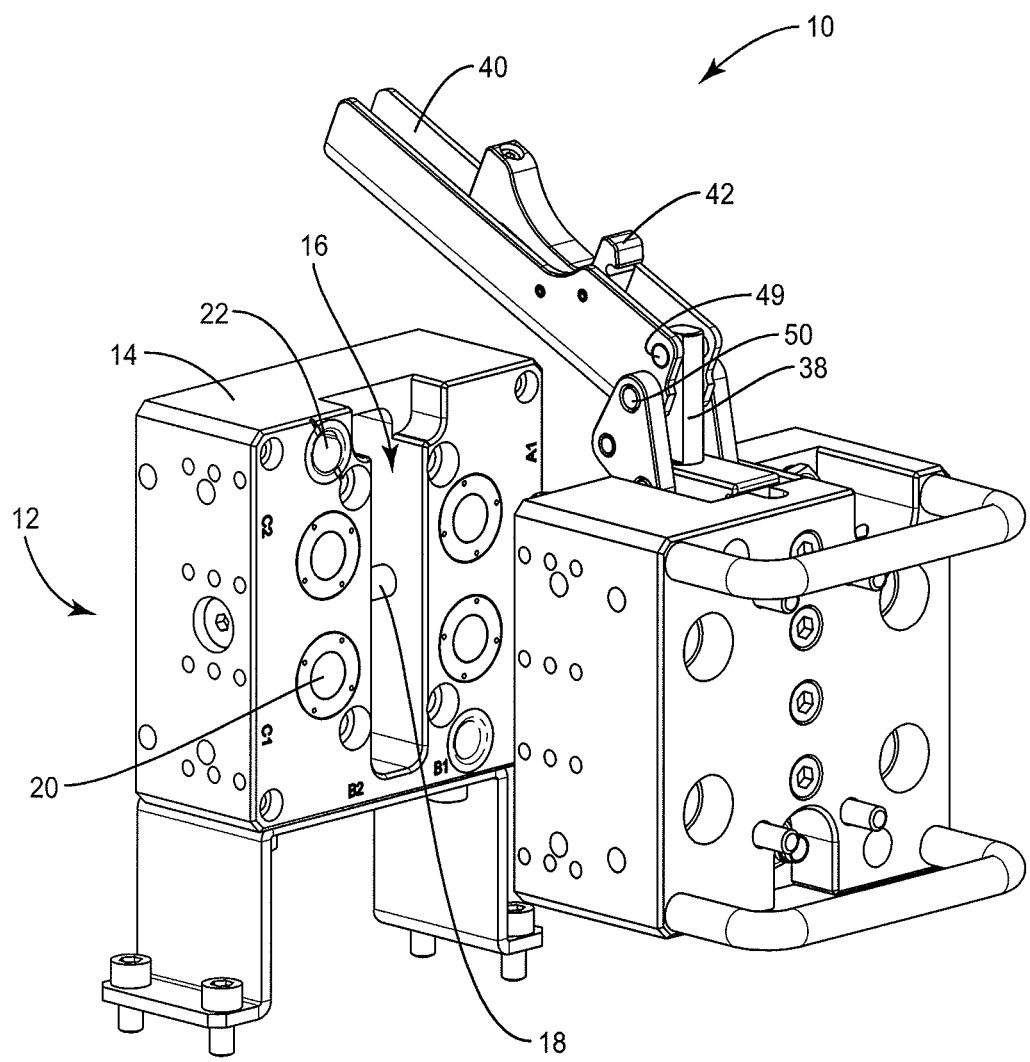
FIG. 2 is a perspective view of the utility coupler showing features of a tool unit.

FIGS. 1 and 2 depict views of a utility coupler, indicated generally by the numeral 10, comprising a tool unit 12 and a coupling unit 30, which may be selectively coupled together and decoupled. In the particular embodiment depicted herein, and used to describe the features of embodiments of the present invention, the utility coupler 10 is manually actuated. However, in other embodiments, the coupling mechanism may be actuated automatically, via robotics, or otherwise. Accordingly, the manually actuated embodiment is not a limitation of the present invention.

Referring to FIG. 2, the tool unit 12 comprises a housing 14 which, in operation, is rigidly affixed to industrial equipment. A groove 16, oriented vertically as depicted in FIG. 2, is formed in the housing 14. Transversely disposed within the groove 16, and rigidly affixed thereto, is a latching pin 18. Utility couplings 20, operative to pass, e.g., pneumatic or hydraulic fluid, are disposed in the face of the housing 14 facing the coupling unit 30. One or more alignment holes 22 are also formed in the face of the housing 14.

Referring to FIG. 1, the coupling unit 30 comprises a housing 32 within which is disposed a hooking cam member 34. The hooking cam member 34 protrudes from the face of the housing 32 facing the tool unit 12, and moves reciprocally in a linear direction within the housing 32 by manual actuation of a handle 40, via a linking rod 38 (see FIG. 2). As depicted in FIGS. 1 and 2, the handle 40 is in the fully decoupled position, in which the hooking cam member 34 is at an uppermost (decoupled) position. In this position, an opening 51 in the hooking cam member 34 is aligned with the linking pin 18 of the tool unit 12 when the two units 12, 30 are aligned.

A safety latch 42 disposed on the handle 40 is operative to latch the handle 40 to the housing 32 when the handle 40 is moved to a fully coupled position (in which case the hooking cam member 34 is in a lowermost position). The handle 40 connects to the linking rod 38 and the housing 32 through an over-center linkage 44, which provides mechanical advantage to actuate the hooking cam member 34 with greater force as the handle 40 approaches the fully coupled position. In particular, the handle 40 is pivotally attached to the linking rod 38 by a handle-rod pin 50, and is also pivotally attached to linkage member of the over-center linkage 44 by a handle-linkage pin 49.

Utility couplings 48 are disposed in the face of the housing 32 facing the tool unit 12, and are operative to mate to corresponding utility couplings 20 in the tool unit 12. One or more alignment pins 46 protrude from the face of the housing 32, and mate with corresponding alignment holes 22 in the housing 14 of the tool unit 12, to align the coupling unit 32 the tool unit 12 as these are coupled together.

In operation, the coupling unit 30—placed into the fully decoupled position by moving the handle 40 to the position shown in FIGS. 1 and 2—is moved towards the tool unit 12 until the units 30, 12 abut. In the process, alignment pins 46 are disposed within corresponding alignment holes 22 to align the coupling unit 32 with the tool unit 12. Additionally, the protruding hooking the cam member 34 is disposed within the groove 16 formed in the tool unit housing 14. With the handle 40 in the fully decoupled position, and the hooking cam member 34 at its uppermost position, the latching pin 18 enters an opening 51 in the hooking cam member 34. The handle 40 is then moved towards the coupled position, actuating the hooking cam member linearly (downwardly as depicted in the Figures), engaging the latching pin with the inner surfaces 36 of the hooking cam member 34.

Figure 3:
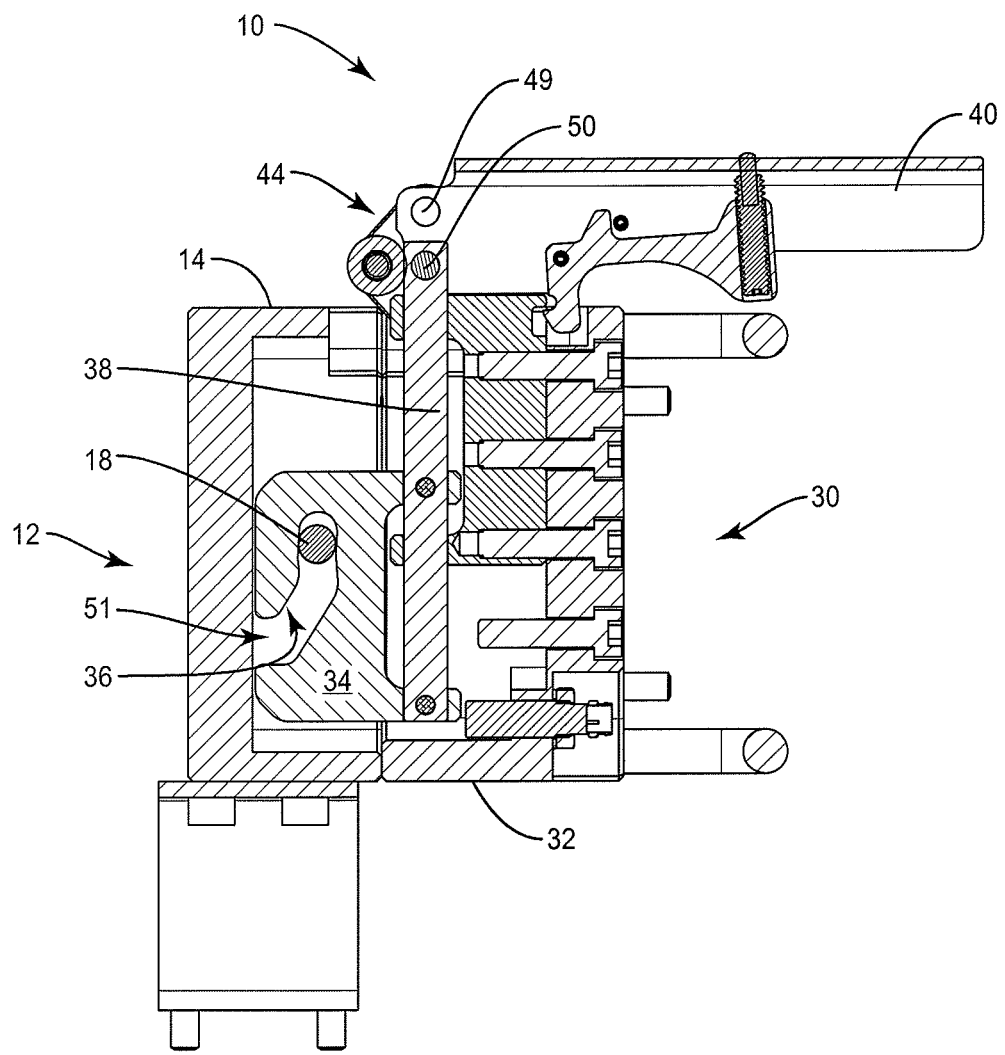
FIG. 3 is a section view of the tool and coupling units fully coupled together.

FIG. 3 depicts the coupling unit 30 fully coupled to the tool unit 12. The coupling unit 30 abuts the tool unit 12, with the hooking the cam member 34 disposed in the groove 16 and "hooking" the latching pin 18. The safety latch 42 latches the handle 40 to the housing 32, requiring the safety latch 42 to be positively actuated to allow the handle 40 to move toward the decoupled position.

Figure 4:
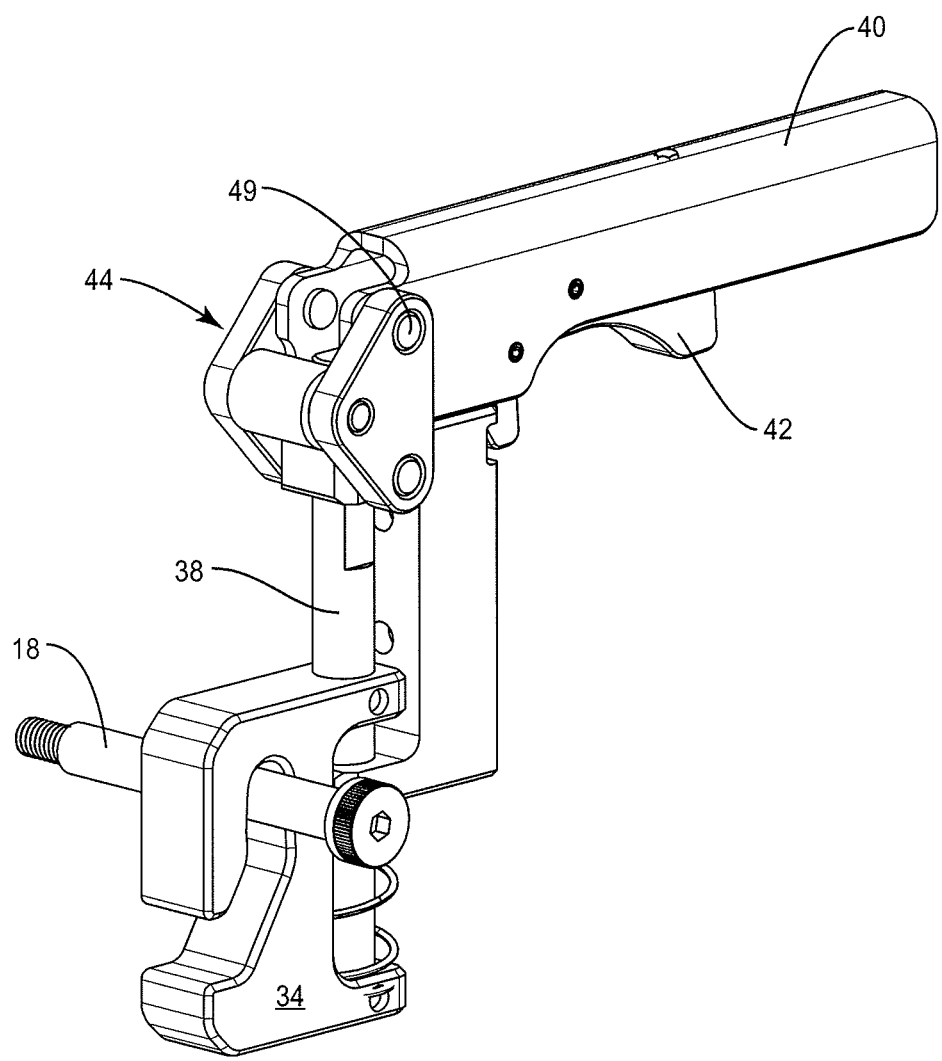
FIG. 4 is a partial perspective view showing the engagement of a hooking cam member and latching pin in a coupled position.

FIG. 4 is a partial perspective view depicting the relationship between the handle 40, linking rod 38, hooking cam member 34, and latching pin 18, in the fully coupled position.

The inner surface 36 of the hooking the cam member 34, which contacts the latching pin 18 and pulls the coupling unit 32 and tool unit 12 together, is a composite of a plurality of cam surfaces having specific angles and relationships, explained in greater detail later. However, as a brief overview, the latching pin 18 initially contacts an initial contact surface 52, which is relatively steeply angled with respect to the linear direction of motion of the hooking cam member 34, so as to draw the coupling unit 30 into abutment with the tool unit 12 as the hooking cam member 34 initially moves downwardly. The latching pin 18 then travels over a failsafe lobe 54 operative to resist motion of the hooking cam member 34 in a decoupling (upward) direction, and a failsafe surface 55 that is parallel to the linear direction motion of the hooking cam member 34. Finally, as depicted in FIGS. 3 and 4, in the fully coupled position, the latching pin 18 is engaged by a locking surface 56, also angled with respect to the linear direction of motion of the hooking cam member 34, although less steeply so than the initial contact surface 52.

Figure 5A:
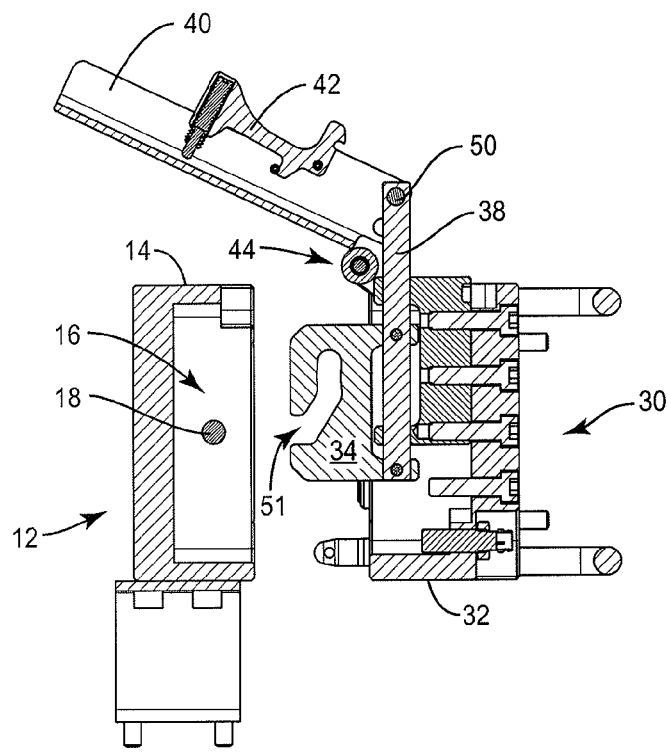
FIGS. 5A through 5F are section views of the tool and coupling units in successive stages between fully decoupled (FIG. 5A) and fully coupled (FIG. 5F).
Figure 5B:
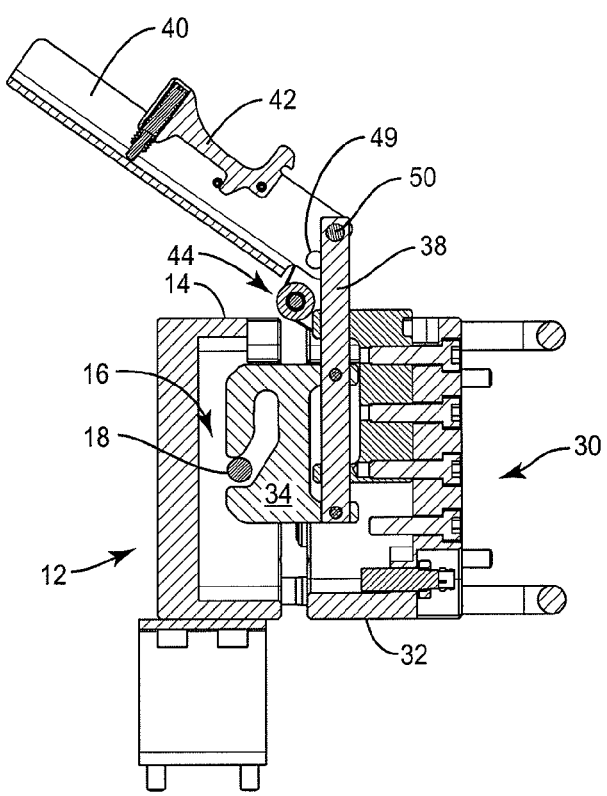
Figure 5C:
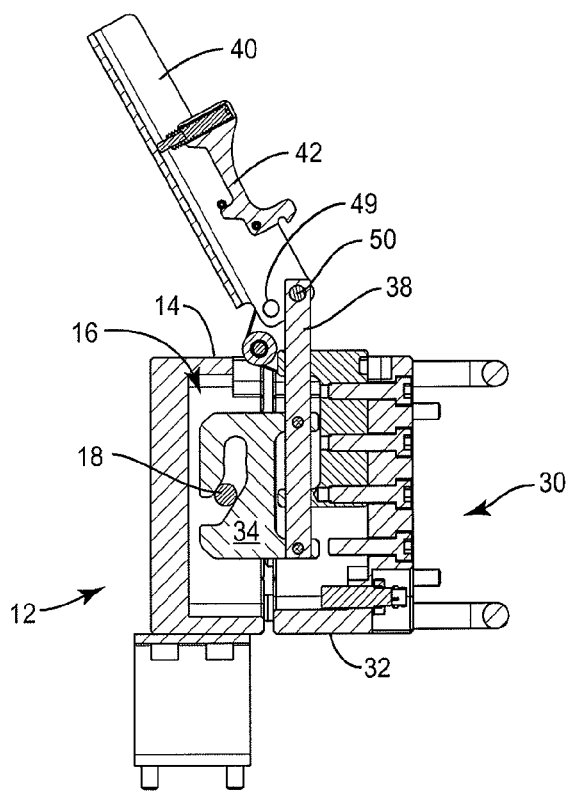
Figure 5D:
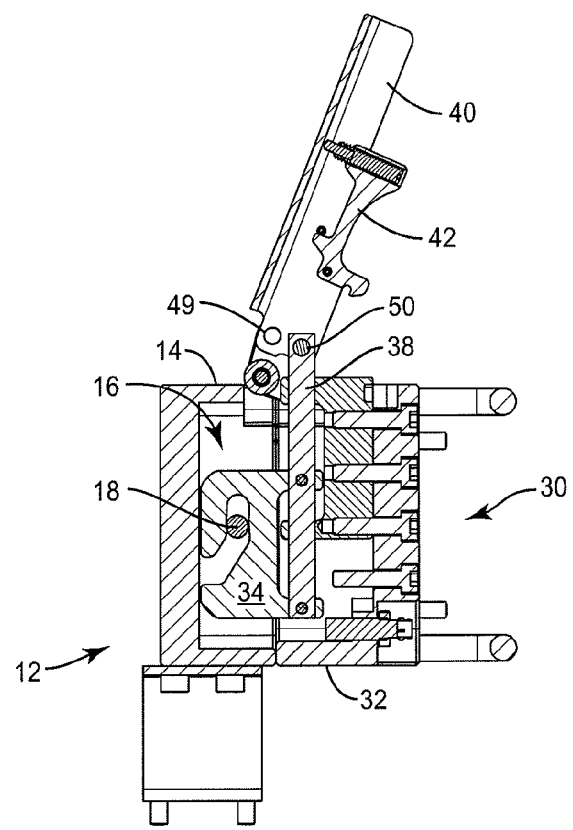
Figure 5E:
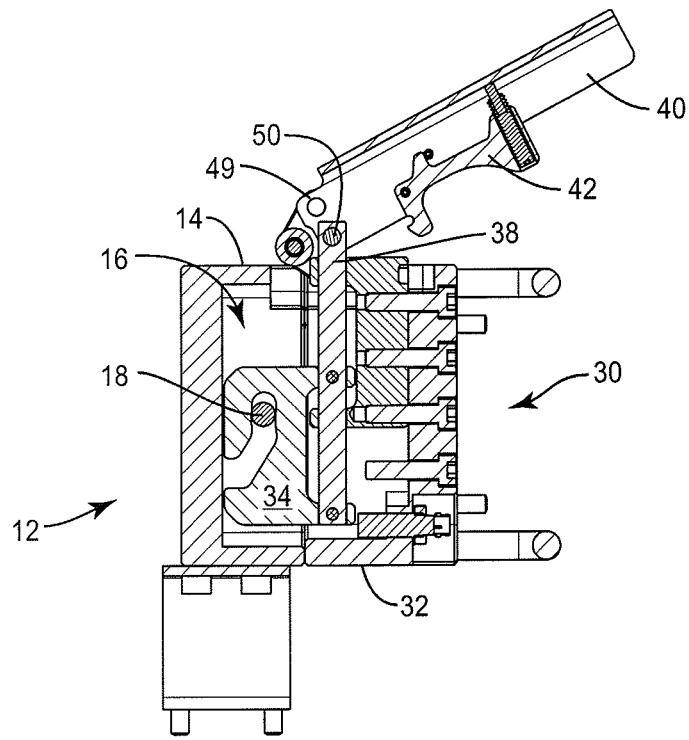
Figure 5F:
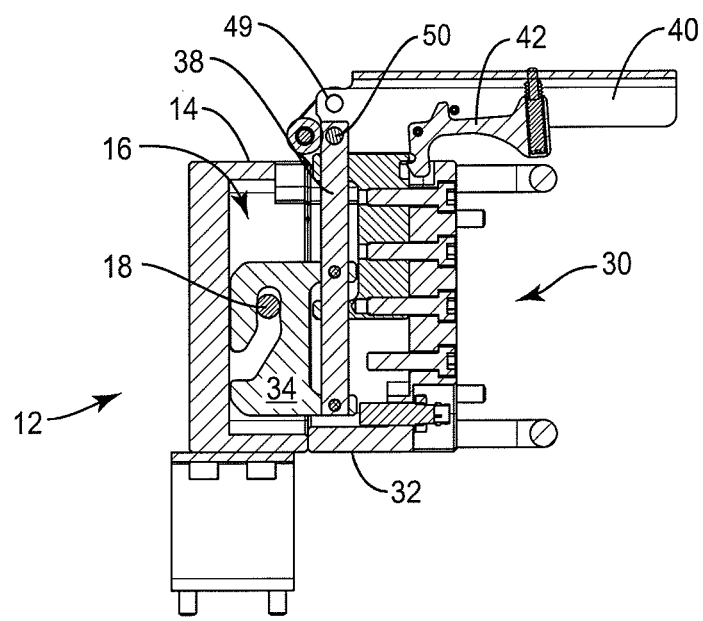

FIGS. 5A through 5F depict the utility coupler 10 in successive stages between the fully decoupled position (FIG. 5A) and the fully coupled position (FIG. 5F). In FIG. 5A, the coupling unit 30 approaches the tool unit 12. The handle 40 is in the fully decoupled position, raising the hooking the cam member 34 to its uppermost position. As depicted in FIG. 5B, in this position, the latching pin 18 is aligned with the opening 51 in the hooking cam member 34. As depicted in FIG. 5C, as the handle 40 is actuated toward the coupled position, the hooking cam member 34 is moved linearly downwardly, pulling the coupling unit 30 into tighter abutment against the tool unit 12, as the latching pin 18 rides the "ramp" of the initial contact surface 52. At FIG. 5D, the latching pin 18 engages a failsafe lobe 54. FIG. 5E depicts the utility coupler 10 in a nearly fully coupled position. The hooking cam member 34 is near the lower extent of its travel, and the latching pin 18 engages the locking surface 56. Finally, FIG. 5F depicts the utility coupler 10 in a fully coupled position. The safety latch 42 locks the handle 40 the housing 32. The hooking cam member 34 is fully extended downwardly, locking the coupling unit 32 the tool unit 12 via the latching pin 18.

FIGS. 5D through 5F additionally depict the over-center action of the over-center linkage 44. In the midway position of FIG. 5D, the handle-linkage pin 49 and handle-rod pin 50 are side-by-side. As the handle 40 moves from this midway position towards the fully coupled position, e.g., as depicted in FIG. 5E, the handle-linkage pin 49 moves over the handle-rod pin 50. In the fully coupled position of FIG. 5F, the handle-linkage pin 49 is directly over the handle-rod pin 50. In moving from the decoupled position (FIG. 5A) to the coupled position (FIG. 5F), the handle 40 actuates the linking rod 38 downwardly, through the handle-rod pin 49. Additionally, as the handle 40 moves further toward the coupled position (FIGS. 5D through 5F), the over-center linkage 44 also forces the linking rod 38 downward, as the handle-linkage pin 49 is affixed to the over-center linkage 44, and has a predetermined maximum extension distance over the housing 32. Thus, the over-center linkage 44 drives the linking rod 38 downward both by action of the handle 40 (through the handle-rod pin 50) and also to position the handle-linkage pin 49 over the handle-rod pin 50 near the fully coupled position. As a result, the mechanical advantage provided by the handle 40 and the over-center linkage 44 dramatically multiplies the force applied to the linking rod 38 (and hence the hooking cam member 34) as the handle 40 moves closer to the fully coupled position.

Figure 6:
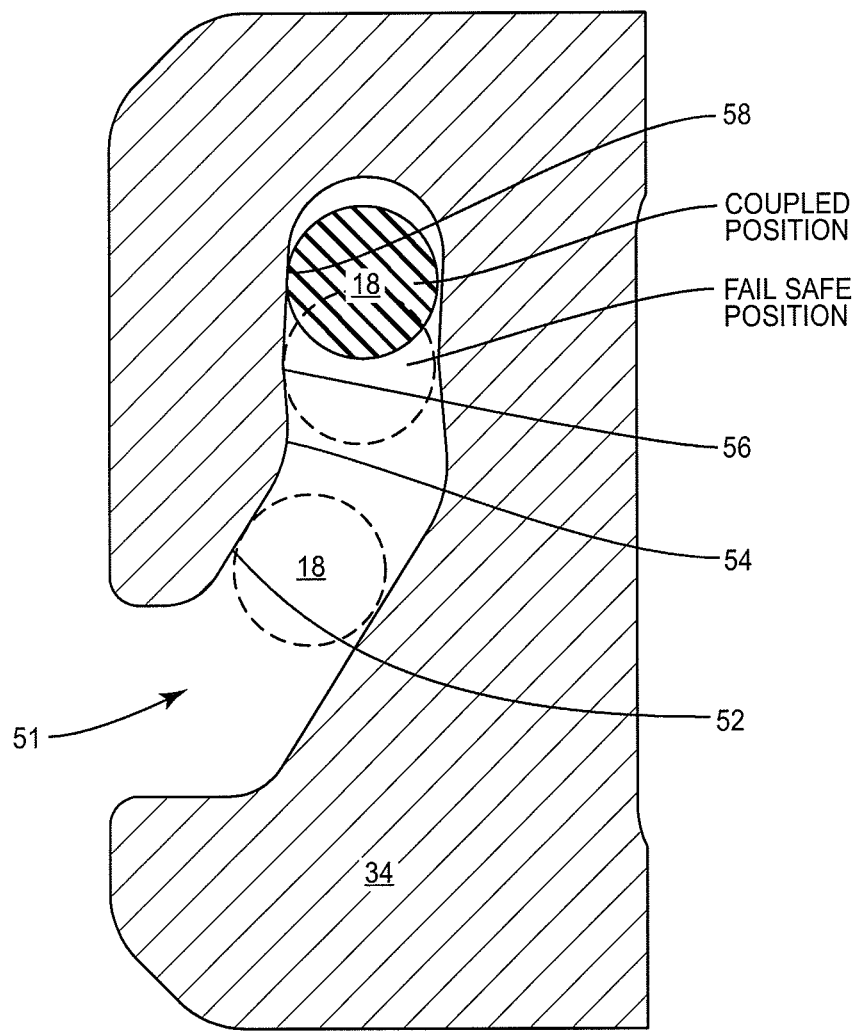
FIG. 6 is a section view of the composite cam surfaces of the hooking cam member and their relation to the latching pin.

FIG. 6 depicts the interaction between the latching pin 18 and the constituent surfaces 52, 56, 58 of the composite cam surface 36 on the interior of the hooking cam member 34. Initially, the latching pin 18 enters the hooking cam member 34 through the opening 51. As the hooking cam member 34 is actuated toward the coupled position (i.e., downwardly, as depicted in the Figures), the latching pin 18 contacts the initial contact surface 52. The initial contact surface 52 is steeply angled with respect to the direction of linear motion of the hooking cam member 34, and serves to draw the coupling unit 18 into abutment with the tool unit 12.

As in the handle 40 moves to the coupled position, the hooking cam member 34 moves downwardly, drawing the latching pin 18 into the interior of the hooking cam member 34, to the position labeled in FIG. 6 as the coupled position. At this point, the latching pin 18 abuts a locking surface 58. The locking surface 58 is also angled with respect to the direction of linear motion of the hooking cam member 34, although not as steeply as the initial contact surface 52. The force exerted by the latching pin 18 against the locking surface 58 is normal to the locking surface 58. Because of the angle of the locking surface 58, this force can be decomposed into vertical and horizontal components. As oriented in FIG. 6, the horizontal component of this force acts to the left, and the vertical component acts upwardly. That is, a component of force exerted by the latching pin 18 on the hooking cam member 34 is in an upward direction, and will urge the hooking cam member 34 upwardly, toward the decoupled position.

The hooking cam member 34 is prevented from upward movement, under the influence of this decoupling force, in the embodiment depicted in FIGS. 1-5, by the safety latch 42 locking the handle 40 to the coupling unit housing 32. However, if the safety latch 42 were to fail, if it were not latched properly upon coupling the units 12, 30 together, or in the case of, e.g., pneumatic actuation of the hooking cam member 34, if the system were to lose pneumatic pressure, then the upward force exerted by the latching pin 18 on the locking surface 56 would tend to decouple the coupling unit 30 from the tool unit 12.

To prevent this static force from decoupling the units 12, 30, a failsafe surface 56 is disposed between the locking surface 58 and the initial contact surface 52. The failsafe surface 56 is parallel to the direction of linear motion of the hooking cam member 34 (vertical as depicted in the Figures). When the latching pin 18 abuts the failsafe surface 56, the force it exerts on the hooking cam member 34 acts entirely to the left, with no upward or downward component. Accordingly, in this position, the latching pin 18 is incapable of urging the hooking cam member 34 towards the decoupled position. This increases both safety and reliability, by thwarting an inherent tendency of the system to decouple if not locked or otherwise maintained in the coupled position.

In one embodiment, to provide an even greater passive safety against inadvertent decoupling, a failsafe lobe 54 is disposed between the failsafe surface 56 and the initial contact surface 52. The failsafe lobe 54 protrudes into the interior of the hooking cam member 34 (to the right in the Figures), providing a bump or protrusion against which the latching pin 18 will abut. The hooking cam member 34 "captures" the latching pin 18, as positive force toward the decoupled position must be applied to the hooking cam member 34 to move the failsafe lobe 54 back past the latching pin 18, towards the opening 51. This further increases safety and reliability, and acts to prevent inadvertent decoupling of the utility coupling 10.

The coupling mechanism comprising the hooking cam member 34, comprising a composite cam surface 36, interacting with a latching pin 18, is scalable. By increasing the size and strength of the hooking cam member 34 and latching pin 18, the size of the utility coupler 10 may be increased, such as to provide a greater number of utilities with a single connection, and/or utility connections having greater flow capacity. Furthermore, in some embodiments, two or more such coupling mechanisms may be employed in the same utility coupler 10, either actuated together (in tandem), or separately for added safety. In some embodiments, the coupling mechanisms may be oriented to operate along different axes. As previously discussed, the handle 40 and over-center linkage 44 may be replaced, in some embodiments, with a pneumatically or hydraulically driven piston, an electric motor, or other automated actuation mechanism.

The utility coupling 10 according to embodiments of the present invention presents numerous advantages over the prior art. The utility coupling 10 provides an easy, reliable way to selectively provide utilities to industrial equipment. The coupling unit 30 attaches to the tool unit 12 in a straightforward manner, without requiring any turning or twisting motion. When coupling the units 12, 30, the coupling unit 30 is moved directly toward and into abutment with the tool unit 12, without inducing any torque that may skew the alignment of utility couplings 20, 48. In one embodiment, the utility coupling 10 is actuated by a handle 40, which provides significant force, through mechanical advantage, pulling the coupling unit 30 into tight abutment against the tool unit 12, as the handle 40 moves toward the fully coupled position. Features of the composite cam surface 36, such as the failsafe surface 56 and failsafe lobe 54, prevent unintentional decoupling of the units 12, 30, if the handle 40 unlatched or if the hooking cam member 34 may otherwise move from the fully coupled position. Finally, a safety latch 42 positively locks the handle 40 to the housing 32 of the coupling unit 30 when the handle 40 is in the fully coupled position.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A utility coupler operative to provide one or more utilities to industrial equipment, comprising:
    a tool unit affixed to industrial equipment, the tool unit comprising
        a housing having a generally flat surface with a longitudinal groove formed therein along a longitudinal axis parallel to the surface, the length of the groove along the housing surface exceeding the depth of the groove into the housing;
        a latching pin disposed in the groove transverse to the groove axis; and
        one or more tool unit utility couplings; and
    a coupling unit comprising
        a housing;
        a hooking cam member reciprocally moveable in the housing in a linear direction along the groove axis and operative to capture the latching pin;
        a composite cam surface on the hooking cam member operative to engage the latching pin and lock the coupling unit to the tool unit as the hooking cam member moves linearly within the groove along the groove axis; and
        one or more coupling unit utility couplings operative to directly contact and mate with corresponding tool unit utility couplings to pass utilities to industrial equipment when the tool unit and coupling unit are coupled together.

2. The utility coupler of claim 1 wherein the composite cam surface comprises:
    an initial contact surface operative to contact the latching pin and pull the coupling unit to the tool unit as the hooking cam member is linearly actuated from a fully decoupled to a partially coupled position;
    a locking surface operative to fully couple the coupling unit to the tool unit as the hooking cam member is linearly actuated to a fully coupled position; and
    a failsafe surface interposed between the initial contact surface and the locking surface, the failsafe surface operative to negate any force from the latching pin on the hooking cam member in direction to decouple the coupling unit from the tool unit.

3. The utility coupler of claim 2 wherein the composite cam surface further comprises:
    a failsafe lobe disposed between the failsafe surface and the initial contact surface and operative to oppose movement of the hooking cam member in direction to decouple the coupling unit from the tool unit.

4. The utility coupler of claim 1 further comprising:
    a handle coupled to the hooking cam member and operative to actuate the hooking cam member reciprocally under manual actuation.

5. The utility coupler of claim 4 wherein the handle actuates the hooking cam member reciprocally between decoupled and coupled positions under manual actuation via a linking rod.

6. The utility coupler of claim 5 wherein the handle connects to the linking rod via an over-center linkage operative to increase the force applied by the handle to the linking rod, by mechanical advantage, as the hooking cam member approaches the fully coupled position.

7. The utility coupler of claim 4 wherein the handle includes a safety latch operative to latch to the coupling unit housing when the handle is actuated to a fully coupled position.

8. The utility coupler of claim 1 wherein the coupling unit further comprises at least one alignment pin and the tool unit further comprises at least one alignment hole in the housing thereof, the alignment pin and hole operative to align the coupling unit and tool unit as the two are moved together.

9. The utility coupler of claim 1 wherein the tool unit comprises a plurality of latching pins, and wherein the coupling unit comprises a corresponding plurality of hooking cam members, each operative to capture a corresponding latching pin.

10. A method of supplying utilities to industrial equipment comprising a tool unit including a groove formed along a surface of a housing thereof, with a latching pin transversely mounted in the groove, and one or more utility couplings operative to directly contact and mate with corresponding utility couplings on a coupling unit when the tool unit and coupling unit are coupled together, the method comprising:
    positioning the coupling unit having a hooking cam member mounted so as to reciprocally move in a linear direction in response to the actuation of a handle, so that the hooking cam member is disposed within the groove of the tool unit and the latching pin enters the interior of the hooking cam member; and
    moving the hooking cam member linearly along the axis of the groove to couple the coupling unit to the tool unit by interaction of the latching pin with cam surfaces in the hooking cam member.

11. The method of claim 10 wherein coupling the coupling unit to the tool unit by interaction of the latching pin with cam surfaces in the hooking cam member comprises:
    pulling the coupling unit to the tool unit as an initial contact surface advances past the latching pin; and
    locking the coupling unit to the tool unit as a locking surface contacts the latching pin.

12. The method of claim 11 wherein coupling the coupling unit to the tool unit further comprises:
    advancing a failsafe surface, interposed between the initial contact surface and the locking surface, past the latching pin, wherein the latching pin exerts no force on the hooking cam member along the direction of its linear motion while the latching pin contacts the failsafe surface.

13. The method of claim 12 wherein coupling the coupling unit to the tool unit further comprises:
    advancing a failsafe lobe, interposed between the failsafe surface and the initial contact surface, past the latching pin, thereby capturing the latching pin so as to require the application of a force on the hooking cam member, along the direction of its linear motion and in a direction toward the decoupled position, to release the latching pin.

14. The method of claim 10 wherein actuating moving the hooking cam member comprises manually actuating a handle operative to move the hooking cam member with increasing force as the handle approaches the fully coupled position, due to mechanical advantage provided by an over-center linkage between the handle and the coupling unit.

15. The method of claim 14 further comprising latching the handle to the coupling unit housing when the handle is actuated to a fully coupled position.

16. The method of claim 10 further comprising aligning the coupling unit to the tool unit, prior to moving the hooking cam member, by aligning alignment pins on the coupling unit with alignment holes in the tool unit.

17. A manually actuated utility coupler, comprising:
- a tool unit comprising a housing having a generally flat surface with a longitudinal groove formed therein along a longitudinal axis parallel to the surface, the length of the groove along the housing surface exceeding the depth of the groove into the housing, a latching pin disposed in the groove transverse to the groove axis, and one or more tool unit utility couplings; and
- a coupling unit comprising one or more coupling unit utility couplings operative to directly contact and mate with corresponding tool unit utility couplings to pass utilities when the tool unit and coupling unit are coupled together, and coupling means for coupling the coupling unit to the tool unit, without applying torque, to capture the latching pin in a hooking cam member and move it along a composite cam surface.

18. The utility coupler of claim 17, wherein the hooking cam member is reciprocally moveable in the housing in a linear direction along the groove axis.

19. The utility coupler of claim 17 wherein the composite cam surface comprises:
- an initial contact surface operative to contact the latching pin and pull the coupling unit to the tool unit as the hooking cam member is linearly actuated from a fully decoupled to a partially coupled position;
- a locking surface operative to fully couple the coupling unit to the tool unit as the hooking cam member is linearly actuated to a fully coupled position; and
- failsafe means for resisting the utility coupler from decoupling.

20. The utility coupler of claim 19 wherein the failsafe means comprises a cam surface parallel to the direction of motion of the hooking cam member, such that the latching pin cannot urge the hooking cam member in a direction to decouple the units when the latching pin contacts the failsafe surface.

21. The utility coupler of claim 19 wherein the failsafe means comprises a lobe formed in the composite cam surface, the lobe operative to capture the latching pin and require the application of force to move the hooking cam member past the latching pin in direction to decouple the coupling unit from the tool unit.

* * * * *